US011295771B2

(12) United States Patent
Sakagami et al.

(10) Patent No.: US 11,295,771 B2
(45) Date of Patent: Apr. 5, 2022

(54) HEAD POSITIONING ASSEMBLY FOR TAPE EMBEDDED DRIVE

(71) Applicant: Western Digital Technologies, Inc., San Jose, CA (US)

(72) Inventors: Akira Sakagami, Kanagawa (JP); Kouki Uefune, Kanagawa (JP); Toshio Takahashi, Tokyo (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/905,781

(22) Filed: Jun. 18, 2020

(65) Prior Publication Data

US 2021/0398558 A1 Dec. 23, 2021

(51) Int. Cl.
| | |
|---|---|
| *G11B 5/55* | (2006.01) |
| *G11B 5/48* | (2006.01) |
| *G11B 5/008* | (2006.01) |
| *G11B 15/28* | (2006.01) |
| *G11B 15/32* | (2006.01) |
| *G11B 23/087* | (2006.01) |

(52) U.S. Cl.
CPC ........ *G11B 5/4893* (2013.01); *G11B 5/00813* (2013.01); *G11B 5/5504* (2013.01); *G11B 15/28* (2013.01); *G11B 15/32* (2013.01); *G11B 23/087* (2013.01); *G11B 23/08757* (2013.01)

(58) Field of Classification Search
None
See application file for complete search history.

(56) References Cited

U.S. PATENT DOCUMENTS

| | | | |
|---|---|---|---|
| 2,578,221 A | 12/1951 | Bodmer | |
| 3,168,232 A | 2/1965 | Beaver | |
| 3,176,927 A | 4/1965 | Irazoqui | |
| 3,667,701 A | 6/1972 | Blum | |
| 3,692,956 A | 9/1972 | Northrup | |
| 3,987,980 A | 10/1976 | Sperry | |
| 4,009,846 A | 3/1977 | Coruzzi | |
| 4,080,638 A | 3/1978 | Platt | |
| 4,263,628 A * | 4/1981 | Timm | G11B 15/1883 242/355.1 |

(Continued)

FOREIGN PATENT DOCUMENTS

| | | |
|---|---|---|
| CA | 1257387 A | 7/1989 |
| JP | H10-241340 A | 9/1998 |

OTHER PUBLICATIONS

Related U.S. Appl. No. 16/365,034, filed Mar. 26, 2019 (39 pages).

(Continued)

*Primary Examiner* — Jefferson A Evans
(74) *Attorney, Agent, or Firm* — Patterson & Sheridan, LLP; Steven H. Versteeg (57) ABSTRACT

The present disclosure generally relates to a head positioning assembly in a tape embedded drive. The tape embedded drive has two reels as well as four guide rollers. The reels and guide rollers are arranged within the tape embedded drive so as to position the head positioning assembly as close to the center of the tape embedded drive as possible. In so doing, the reels, guide rollers, and head assembly are more stable which reduces or even eliminates shock and vibration to the tape embedded drive.

16 Claims, 5 Drawing Sheets

(56) References Cited

U.S. PATENT DOCUMENTS

| | | | |
|---|---|---|---|
| 4,266,255 A | 5/1981 | Camras | |
| 4,303,210 A | 12/1981 | Fujita et al. | |
| 4,562,497 A | 12/1985 | Morinaga et al. | |
| 4,575,022 A | 3/1986 | Allwine, Jr. et al. | |
| 4,583,135 A * | 4/1986 | Kimura | G11B 5/58 |
| | | | 310/328 |
| 5,055,947 A | 10/1991 | Satoh | |
| 5,173,828 A | 12/1992 | Tanzer et al. | |
| 5,191,492 A * | 3/1993 | Nayak | G11B 5/5504 |
| | | | 360/77.12 |
| 5,379,170 A * | 1/1995 | Schwarz | G11B 5/584 |
| | | | 360/291 |
| 5,543,992 A | 8/1996 | Hu et al. | |
| 5,663,845 A * | 9/1997 | Yamamoto | G11B 15/46 |
| | | | 360/73.04 |
| 5,739,970 A * | 4/1998 | Kobayashi | G11B 15/20 |
| | | | 360/74.1 |
| 5,818,668 A * | 10/1998 | Gonzales | G11B 5/5504 |
| | | | 360/261.3 |
| 5,881,960 A | 3/1999 | Christie | |
| 5,883,770 A * | 3/1999 | Biskeborn | G11B 15/602 |
| | | | 360/130.21 |
| 5,883,771 A | 3/1999 | Hoerger | |
| 5,978,188 A * | 11/1999 | Kaaden | G11B 5/5504 |
| | | | 360/130.32 |
| 5,982,592 A * | 11/1999 | Saito | G11B 15/62 |
| | | | 360/130.31 |
| 6,163,432 A | 12/2000 | Van Den Dungen | |
| 6,305,630 B1 * | 10/2001 | Argento | G11B 15/08 |
| | | | 242/338 |
| 6,466,400 B1 | 10/2002 | Iwahara et al. | |
| 6,498,699 B1 * | 12/2002 | Collins | G11B 15/26 |
| | | | 360/90 |
| 6,535,349 B1 * | 3/2003 | Collins | G11B 5/52 |
| | | | 360/96.3 |
| 6,710,968 B1 * | 3/2004 | Collins | G11B 15/60 |
| | | | 360/83 |
| 6,886,766 B1 | 5/2005 | Weng et al. | |
| 7,054,101 B1 * | 5/2006 | Marion | G11B 5/00821 |
| | | | 360/261 |
| 7,733,598 B1 * | 6/2010 | Willems | G11B 23/087 |
| | | | 360/96.1 |
| 8,934,187 B2 * | 1/2015 | Ochi | G11B 15/62 |
| | | | 360/55 |
| 9,824,715 B2 | 11/2017 | Vanderheyden | |
| 9,892,751 B1 | 2/2018 | Harper | |
| 10,395,687 B1 * | 8/2019 | Bui | G11B 5/00813 |
| 2001/0002158 A1 | 5/2001 | Cope et al. | |
| 2003/0235011 A1 * | 12/2003 | Rubas | G11B 5/60 |
| | | | 360/261.1 |
| 2004/0004789 A1 | 1/2004 | Watanabe et al. | |
| 2004/0160697 A1 * | 8/2004 | Nakao | G11B 5/584 |
| | | | 360/77.13 |
| 2006/0103968 A1 * | 5/2006 | Jurneke | G11B 5/584 |
| | | | 360/76 |
| 2006/0256465 A1 | 11/2006 | Biskeborn | |
| 2007/0008683 A1 * | 1/2007 | Gavit | G11B 33/1446 |
| | | | 361/679.33 |
| 2007/0236827 A1 | 10/2007 | Eaton et al. | |
| 2008/0068753 A1 | 3/2008 | Biskeborn et al. | |
| 2008/0198506 A1 | 8/2008 | Weng et al. | |
| 2009/0067097 A1 * | 3/2009 | Biskeborn | G11B 5/52 |
| | | | 360/291 |
| 2009/0122446 A1 * | 5/2009 | Johnson | G11B 23/08757 |
| | | | 360/130.21 |
| 2009/0141389 A1 * | 6/2009 | Saliba | G11B 5/584 |
| | | | 360/71 |
| 2009/0141393 A1 * | 6/2009 | Vanderheyden | G11B 23/08785 |
| | | | 360/93 |
| 2009/0316299 A1 | 12/2009 | Tashiro et al. | |
| 2010/0214689 A1 * | 8/2010 | Haeberle | G11B 5/584 |
| | | | 360/77.12 |
| 2011/0255195 A1 * | 10/2011 | Poorman | G11B 5/584 |
| | | | 360/241 |
| 2012/0154950 A1 | 6/2012 | Fasen et al. | |
| 2012/0206832 A1 | 8/2012 | Hamidi et al. | |
| 2013/0019465 A1 | 1/2013 | Childers et al. | |
| 2013/0021694 A1 * | 1/2013 | Childers | G11B 23/049 |
| | | | 360/96.1 |
| 2013/0050872 A1 | 2/2013 | Sekii et al. | |
| 2013/0148235 A1 * | 6/2013 | Ochi | G11B 15/62 |
| | | | 360/75 |
| 2014/0362465 A1 * | 12/2014 | Anderson | G11B 15/605 |
| | | | 360/83 |
| 2015/0002958 A1 * | 1/2015 | Altknecht | G11B 15/6651 |
| | | | 360/74.1 |
| 2015/0310881 A1 | 10/2015 | Koui | |
| 2016/0104515 A1 | 4/2016 | Strange | |
| 2016/0180871 A1 * | 6/2016 | Brong | G11B 5/00813 |
| | | | 360/125.72 |
| 2016/0232936 A1 * | 8/2016 | Poorman | G11B 5/29 |
| 2020/0365184 A1 * | 11/2020 | Endo | G11B 15/60 |

OTHER PUBLICATIONS

Yang, Hankang et al.; "Mechanics of Lateral Positioning of a Translating Tape Due to Tilted Rollers: Theory and Experiments"; Elsevier, International Journal of Solids and Structures, vol. 66, 2015, pp. 88-97.

Brake M.R. et al.; "Lateral Vibration and Read/Write Head Servo Dynamics in Magnetic Tape Transport"; Mechanical Engineering Publications, Journal of Dynamic Systems, Measurement and Control 132, No. 1, Jan. 2010 (13 pages).

Taylor, Ryan J. et al.; "Investigation of Roller Interactions with Flexible Tape Medium"; Elsevier, Tribology International, vol. 38, www.elsevier.com/locate/triboint, Feb. 2005, pp. 599-605.

Lenovo, "IBM LTO Ultrium Tape Drives for Lenovo"; https://lenovopress.com/tips1305.pdf, (17 pages).

Tape Drives and Media, LTO Drive Requirements and Compatibility; https://qsupport.quantum.com/kb/flare/content/Scalar_i6000/docCenter/, 2020, (2 pages).

* cited by examiner

HEAD POSITIONING ASSEMBLY FOR TAPE EMBEDDED DRIVE

BACKGROUND OF THE DISCLOSURE

Field of the Disclosure

Embodiments of the present disclosure generally relate to a head positioning assembly for a tape embedded drive.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head comprises servo elements and data elements that are arranged in an array that is oftentimes referred to as a tape head array.

In operation, the tape drive system has many moving parts such as a tape that moves between two reels. In between the two reels, the tape rolls over numerous rollers guiding the tape to a reading or writing position in front of the head. Individually, the moving parts are of little significance, but collectively, the numerous moving parts can create quite a significant movement of the tape drive, such as shock and vibration of the tape drive, which creates an unstable tape drive.

Therefore, there is a need in the art for an improved tape drive that have improved stability.

SUMMARY OF THE DISCLOSURE

The present disclosure generally relates to a head positioning assembly in a tape embedded drive. The tape embedded drive has two reels as well as four guide rollers. The reels and guide rollers are arranged within the tape embedded drive so as to position the head positioning assembly as close to the center of the tape embedded drive as possible. In so doing, the reels, guide rollers, and head assembly are more stable which reduces or even eliminates shock and vibration to the tape embedded drive.

In one embodiment, a storage device comprises: an enclosure having a first wall, a second wall, and a third wall extending between the first wall and the second wall, and a fourth wall extending between the first wall and the second wall, wherein the first wall and the second wall are substantially parallel to each other, and wherein the third wall and the fourth wall are substantially parallel to each other; a first tape media reel disposed within the enclosure; a second tape media reel disposed within the enclosure, wherein a first hypothetical line intersects a bottommost location of the first tape media reel and a bottommost location of the second tape media reel, wherein the bottommost location of the first tape media reel and the bottommost location of the second tape media reel is disposed farther away from the third wall as compared to a topmost location of the first tape media reel and a topmost location of the second tape media reel; and a head positioning assembly for reading data from and writing data to tape media, wherein the head positioning assembly is disposed within the enclosure, wherein the head positioning assembly is movable to move a read head to a location that is closer to a center of the enclosure than the first hypothetical line.

In another embodiment, a storage device comprises: an enclosure; a first tape media reel disposed within the enclosure; a second tape media reel disposed within the enclosure; a plurality of guide rollers disposed within the enclosure, wherein a first hypothetical line intersects a topmost location of at least two guide rollers of the plurality of guide rollers, wherein the topmost location of the at least two guide rollers is closer to a center of the enclosure as compared to a bottommost portion of the first tape media reel; and a head positioning assembly for reading data from and writing data to tape media, wherein the head positioning assembly is disposed within the enclosure, wherein the head positioning assembly is movable to move a read head to a location that is substantially equal to a location of the first hypothetical line.

In another embodiment, a storage device comprises: an enclosure; a first tape media reel disposed within the enclosure; a second tape media reel disposed within the enclosure; a plurality of guide rollers disposed within the enclosure, wherein the plurality of guide rollers cause tape media to follow a path from the first tape media reel to the second tape media reel that forms a "W" when viewed from a top of the enclosure; and a head positioning assembly for reading data from and writing data to the tape media, wherein the head positioning assembly is disposed within the enclosure, wherein the head positioning assembly is movable to move a read head to a reading location that is closer to a center of the enclosure than a non-reading location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a head positioning assembly in a tape embedded drive. The tape embedded drive has two reels as well as four guide rollers. The reels and guide rollers are arranged within the tape embedded drive so as to position the head positioning assembly as close to the center of the tape embedded drive as possible. In so doing, the reels, guide rollers, and head assembly are more stable which reduces or even eliminates shock and vibration to the tape embedded drive.

Figure 1A:
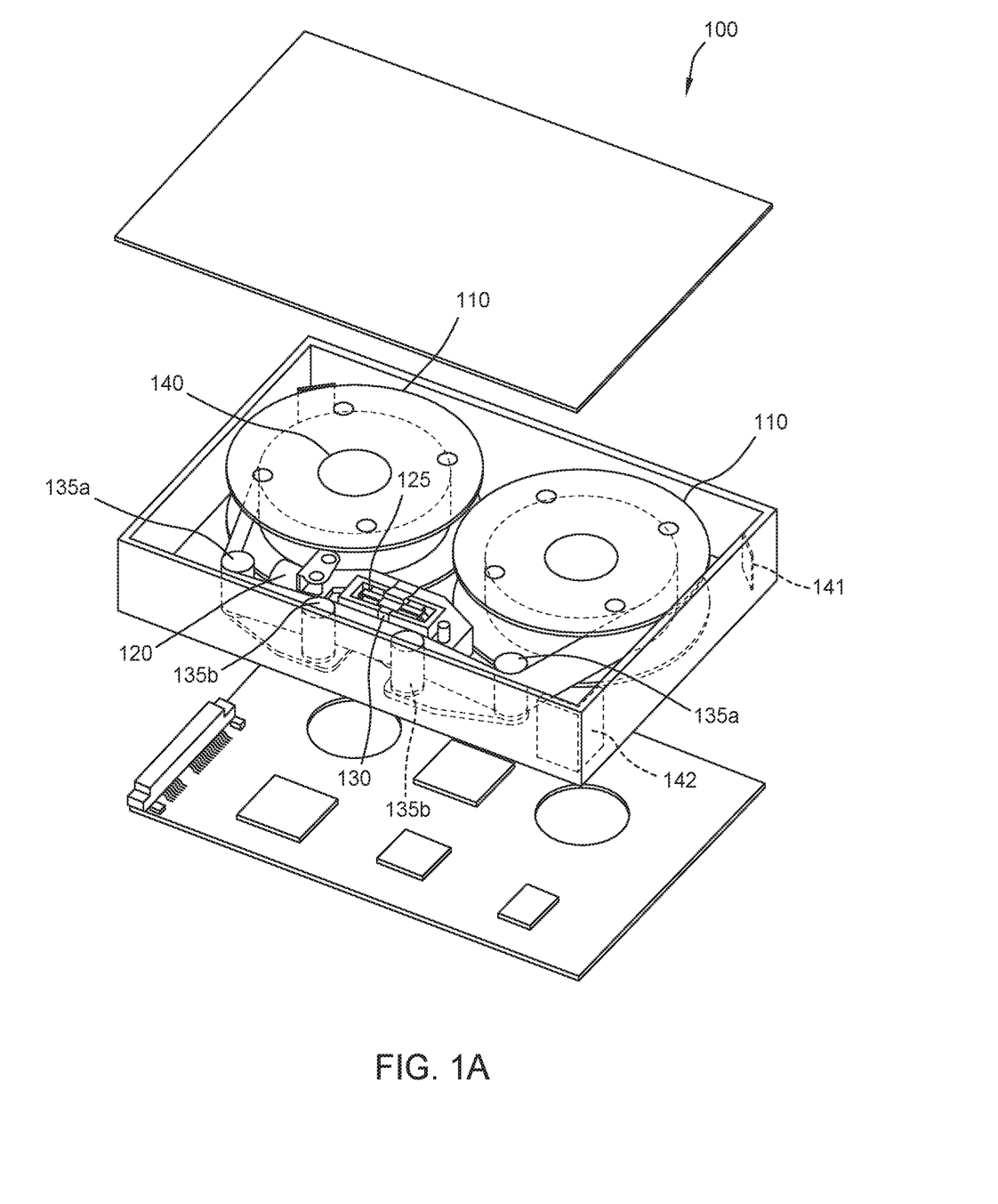
FIGS. 1A-1C illustrate a perspective exploded view and a simplified top down and side profile view of a tape embedded drive, in accordance with some embodiments.
Figure 1B:
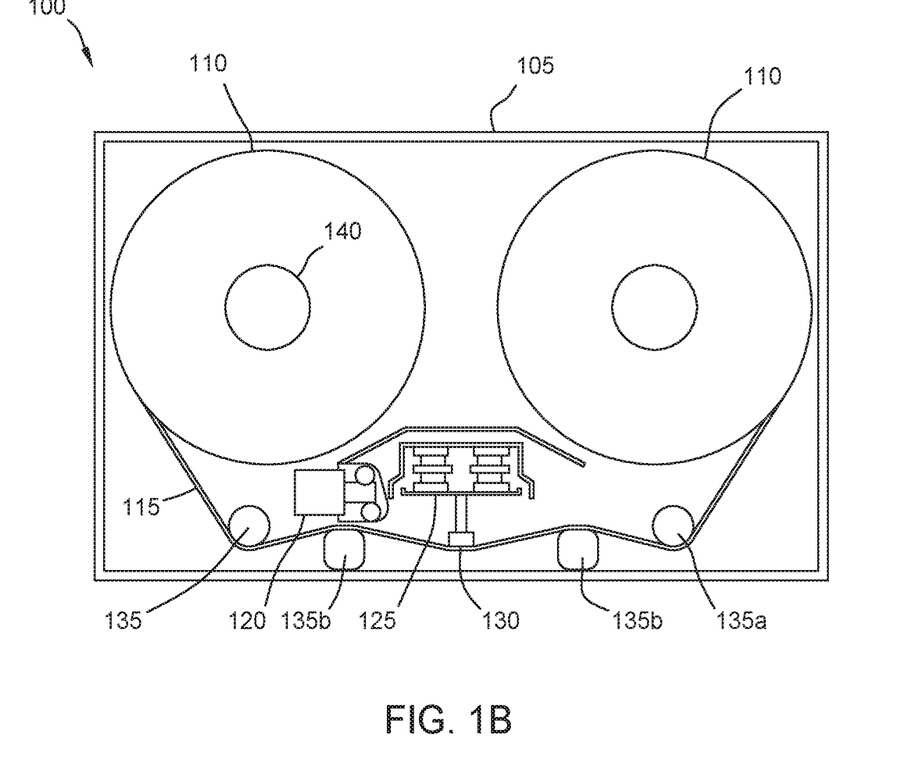
Figure 1C:
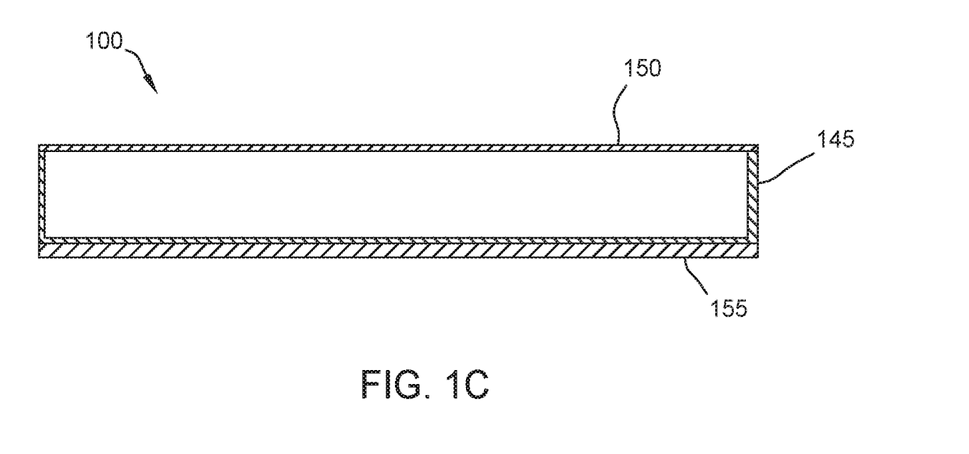

FIGS. 1A-1C illustrate a perspective exploded view and a simplified top down and side profile view of a tape embedded drive, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two functional rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
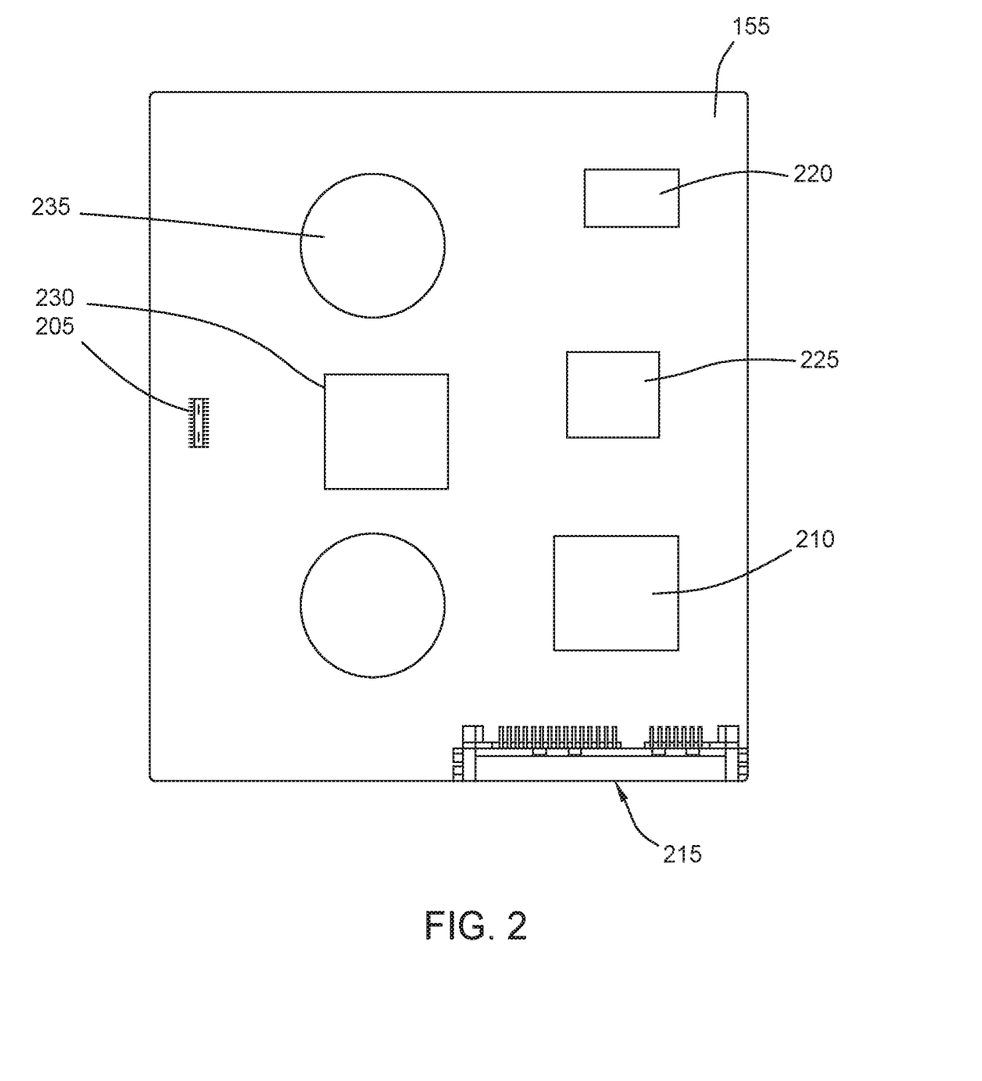
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

While the above discusses the tape embedded drive 100 as having a casing with a 3.5 inch form factor like that of HDDs, the tape embedded drive 100 may use other form factors. For example, if tape technology become sufficiently miniaturized in the future, then the tape embedded drive could use a 2.5 inch drive form factor, like that used by laptop HDDs. In some embodiments, where larger sizes are desired, the tape embedded drive 100 may use a 5.25 inch drive form factor for the casing, such as those used by computer CD-ROMs.

Furthermore, the tape embedded drive 100 may use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch drive form factor based infrastructure found in various computer equipment, such as racks and servers.

Figure 3:
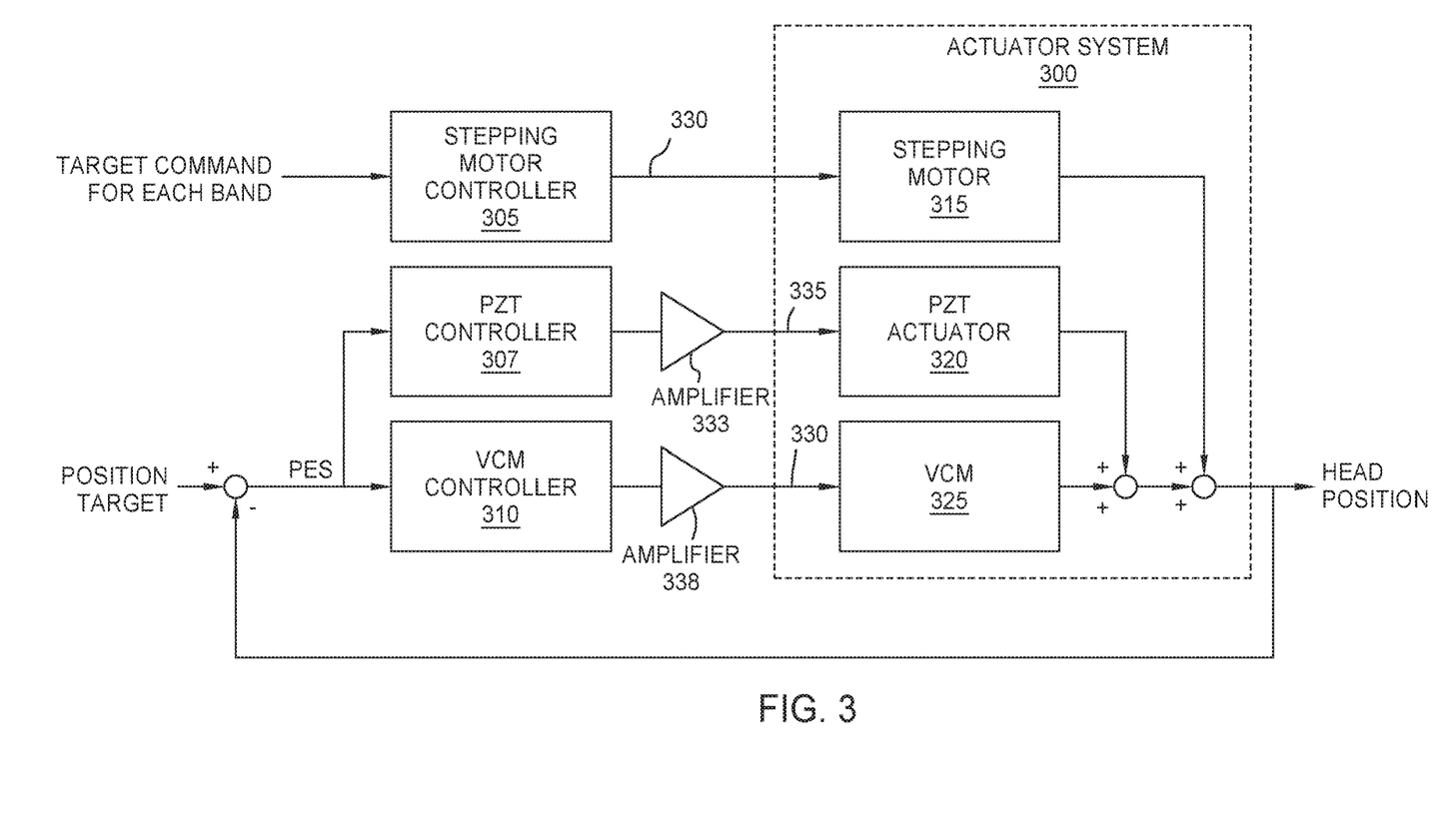
FIG. 3 illustrates a control block diagram for a servo-mechanical system of the tape embedded drive, in accordance with some embodiments.

FIG. 3 illustrates a control block diagram for a servo-mechanical system 300 of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor:VCM:PZT actuator). In other embodiments, the ratios may be different based on the performance specifications of the motors and the actuators.

A first control signal 330 is sent from the stepping motor controller to the stepping motor. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

Figure 4:
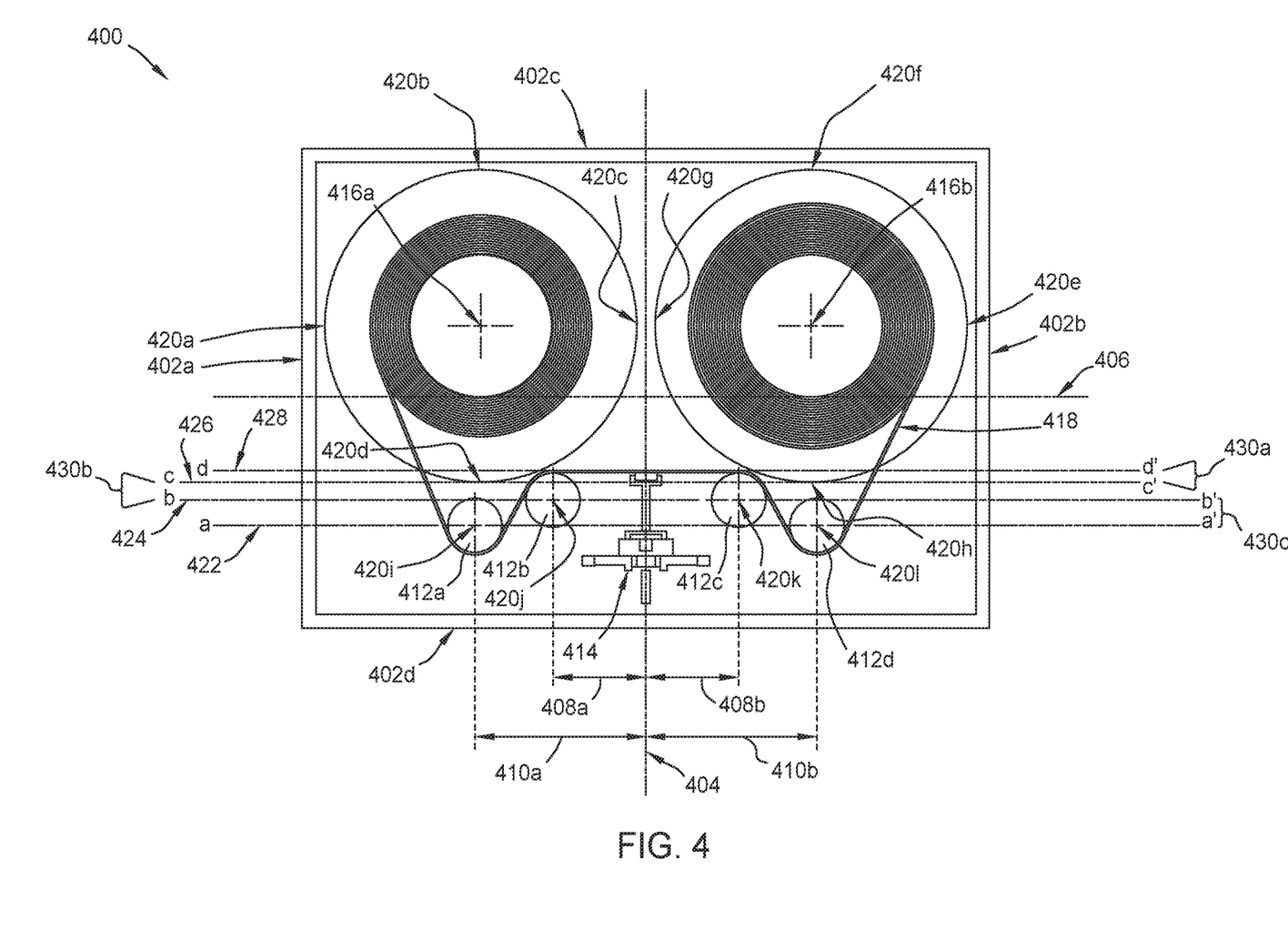
FIG. 4 is a schematic top view of a tape embedded drive in accordance with one embodiment.

FIG. 4 is a schematic top view of a tape embedded drive 400 in accordance with one embodiment. Aspects of the tape embedded drive 100 of FIG. 1 may be similar to the tape embedded drive 400. The head positioning assembly 414 may be similar to the head assembly 130 of FIG. 1.

Furthermore, components of the tape embedded drive 400 may have the same function as the components of the tape embedded drive 100 of FIG. 1. The tape guide/rollers 412a, 412b, 412c, 412d may be similar to the tape guide/rollers 135a, 135b of FIG. 1 and the reels 416a, 416b may be similar to the reels 140 of FIG. 1. Likewise, the tape media 418 may be similar to the tape media 115 of FIG. 1.

However, the overall configuration of the tape embedded drive 400 optimizes the position of the head positioning assembly 414 and tape guides/rollers 412a, 412b, 412c, 412d with the reels 416a, 416b, such that the tape embedded drive 400 may be mechanically more stable due to less vibrations from the movement of the mechanical components than that of the tape embedded drive 100 of FIG. 1. The tape embedded drive 400 comprises a first wall 402a and a second wall 402b, wherein the first wall 402a and the second wall 402b are parallel and are the same length. An end of the first wall 402a and a respective end of the second wall 402b are connected by a third wall 402c, wherein the third wall 402c is perpendicular to the first wall 402a and the second wall 402b. A fourth wall 402d is perpendicular to both the first wall 402a and the second wall 402b and parallel to the third wall 402c. The fourth wall 402d connects the first wall 402a and the second wall 402b at the opposite end of where the third wall 402c connects the first wall 402a and the second wall 402b. The third wall 402c and the fourth wall 402d are parallel and are the same length, wherein the length of the third wall 402c and the fourth wall 402d is longer than the length of the first wall 402a and the second wall 402b. The first wall 402a, second wall 402b, third wall 402c, and fourth wall 402d are arranged in the configuration above to create an enclosure (referred to as enclosure 402 for the configurations of the walls described above) for the components of the tape embedded drive 400.

Furthermore, the enclosure 402 has a hypothetical horizontal axis 406 and a hypothetical vertical axis 404, wherein the hypothetical horizontal axis 406 intersects the midpoint of the first wall 402a and the midpoint of the second wall 402b and the hypothetical vertical axis 404 intersects the midpoint of the third wall 402c and the midpoint of the fourth wall 402d. The tape embedded drive 400 further comprises within the enclosure 402 a first reel 416a, a second reel 416b, a first guide/roller 412a, a second guide/roller 412b, a third guide/roller 412c, a fourth guide/roller 412d, a tape media 418 (may be referred to as tape film 418), and a head positioning assembly 414. The guide/roller may referred to as a guide or a roller for simplification and exemplary purposes.

The head positioning assembly 414 may be designed symmetrically about its centerline so that the head positioning assembly 414 is situated along the vertical axis 404 with the head elements, such as the one or more read/write heads, facing towards the center of the enclosure (i.e., the cross-section of the horizontal axis 406 and the vertical axis 404). The majority of reels 416a, 416b are located between the horizontal axis 406 and the third wall 402c, such that the reels 416a, 416b are on the same level in the enclosure 402 and the level that the reels 416a, 416b are located on is parallel to the horizontal axis 406. In one embodiment, the tape reels may be identical to each other. As used herein for FIG. 4, a "level" denotes the horizontal positioning of a location relative to the third wall 402c or the fourth wall 402d, in this top view of the tape embedded drive 400.

The outside edge of each reel 416a, 416b comprises four notable locations. For example, the outside edge of a first reel 416a comprises a first location 420a adjacent to the first wall 402a, a second location 420b adjacent to the third wall 402c, a third location 420c adjacent to the vertical axis 404, and a fourth location 420d. Similarly, the second reel 416b comprises a fifth location 420e adjacent to the second wall 402b, a sixth location 420f adjacent to the third wall 402c, a seventh location 420g adjacent to the vertical axis 404, and an eighth location 420h. The first location 420a, third location 420c, fifth location 420e, and seventh location 420g are on the same level in the enclosure 402, such that the level is parallel with the horizontal axis 406. Likewise, the second location and the sixth location 420f are on the same level in the enclosure 402 and the fourth location 420d and the eighth location 420h are on the same level in the enclosure 402, such that the two levels mentioned previously are parallel with the horizontal axis 406. The second location 420b and the fourth location 420d are on the same level in the enclosure and the sixth location 420f and the eighth location 420h are on the same level in the enclosure, such that the two levels previously mentioned are parallel with the vertical axis 404.

The enclosure 402 comprises four rollers, in which each roller, such as a first roller 412a, a second roller 412b, a third roller 412c, and a fourth roller 412d, may be substantially identical to one or more other rollers of the enclosure 402. The first roller 412a is in an eleventh location 420i, the second roller 412b is in a ninth location 420j, the third roller 412c is in a tenth location 420k, and the fourth roller 412d is in a twelfth location 420l within the enclosure 402. The second roller 412b and the third roller 412c are on the same level in the enclosure 402 and the first roller 412a and the fourth roller 412d are on the same level in the enclosure 402, wherein the two levels previously mentioned are parallel with the horizontal axis 406. Furthermore, the edge closest to the horizontal axis 406 of the second roller 412b and the edge closest to the horizontal axis 406 of the third roller 412c are connected by a first hypothetical line d-d' 428 (i.e., a tangent line). The fourth location 420d and the eighth location 420h are connected by a second hypothetical line c-c' 426 (i.e., a tangent line). The first hypothetical line d-d' 428 is closer to the horizontal axis 406 than the second hypothetical line c-c' 426.

The second roller 412b in the ninth location 420j and the third roller 412c in the tenth location 420k is connected by a third hypothetical line b-b' 424. The first roller 412a in the eleventh location 420i and the fourth roller 412d in the twelfth location 420l is connected by a hypothetical fourth hypothetical line a-a' 422. The third hypothetical line b-b' 424 is closer to the horizontal axis 406 than the fourth hypothetical line a-a' 422. However, the third hypothetical line b-b' 424 is between the second hypothetical line c-c' 426 and the fourth hypothetical line a-a' 422.

The head positioning assembly 414 may be maneuvered along the vertical axis 404 so that the one or more read/write heads of the head positioning assembly contacts an oxide side of the tape media 418 during read/write operations at the first hypothetical line d-d' 428. Furthermore, the second roller 412b is spaced a first distance 408a from the center of the head positioning assembly 414 and the third roller 412c is spaced a second distance 408b from the center of the head positioning assembly 414, such that the second roller 412b and the third roller 412c are equidistant from the head positioning assembly 414. Likewise, the first roller 412a is spaced a third distance 410a from the center of the head positioning assembly 414 and the fourth roller 412d is spaced a fourth distance 410b from the center of the head positioning assembly 414, such that the first roller 412a and the fourth roller 412d are equidistant from the head positioning assembly 414. However, the first distance 408a and the second distance 408b is less than the distance of the third distance 410a and the fourth distance 410b, respectively.

The tape media 418, during wind/unwind operations, follows a path from the first tape reel 416a to the second tape reel 416b that forms a "W" when viewed from a top view of the enclosure 402. The tape media 418 may be closer to the tape reels 416a, 416b through the entire pathway than the tape media 115 of the embodiment illustrated in the tape embedded device 100 of FIG. 1, thus may contribute to a greater tape media 418 stability during tape wind/unwind operations. Furthermore, since the tape media 418 is closer to the tape reels 416a, 416b, the head positioning assembly 414 may be positioned so that the one or more read/write heads faces the horizontal axis 406 and is closer to the horizontal axis, unlike the head assembly 130 of FIG. 1. By positioning the one or more read/write heads closer to the center (i.e., the cross-section of the horizontal axis 406 and the vertical axis 404), the effect of vibrations on the one or more read/write heads is lessened, such that the angle that the one or more read/write heads may undesirably move is decreased. During read and write operations of the tape embedded drive, a stable read/write head may result in better data transfer to and from the tape media. The less vibrations and the decreased undesired movement of the one or more read/write heads may result in an improved read/write operation and more mechanically stable tape embedded drive 400.

By placing the guide rollers in specific positions within the tape embedded drive, the tape embedded drive can operate with little to no shock or vibration and thus be a stable tape embedded drive. In such an arrangement, the head assembly is placed close to the center of the tape embedded drive enclosure and thus, the component mass balance inside of the enclosure becomes more symmetric and hence more shock and vibration resistant. The rollers positioned to create a "W" shape for the tape provides more room for the head assembly to be secured within the enclosure for design flexibility while allowing the head assembly to be placed closer to the center of the enclosure.

In one embodiment, a storage device comprises: an enclosure having a first wall, a second wall, and a third wall extending between the first wall and the second wall, and a fourth wall extending between the first wall and the second wall, wherein the first wall and the second wall are substantially parallel to each other, and wherein the third wall and the fourth wall are substantially parallel to each other; a first tape media reel disposed within the enclosure; a second tape media reel disposed within the enclosure, wherein a first hypothetical line intersects a bottommost location (e.g., adjacent the fourth wall 402d) of the first tape media reel and a bottommost location (e.g., adjacent the fourth wall 402d) of the second tape media reel, wherein the bottommost location of the first tape media reel and the bottommost location of the second tape media reel is disposed farther away from the third wall as compared to a topmost location (e.g., adjacent the third wall 402c) of the first tape media reel and a topmost location (e.g., adjacent the third wall 402c) of the second tape media reel; and a head positioning assembly for reading data from and writing data to tape media, wherein the head positioning assembly is disposed within the enclosure, wherein the head positioning assembly is movable to move a read head to a location that is closer to a center of the enclosure than the first hypothetical line. The storage device further comprises a first guide roller; a second guide roller; a third guide roller; and a fourth guide roller, wherein a second hypothetical line intersects a center of the second guide roller and the third guide roller. The second hypothetical line extends tangent to the first guide roller and the fourth guide roller. A third hypothetical line intersects a center of the first guide roller and the fourth guide roller. The third hypothetical line extends tangent to the second guide roller and the third guide roller. The second hypothetical line is closer to the center of the enclosure than the fourth hypothetical line. The first hypothetical line is closer to the center of the enclosure than the second hypothetical line. A third hypothetical line extends tangent to the second guide roller and the third guide roller. The third hypothetical line is closer to the center of the enclosure than the first hypothetical line. The second guide roller and the third guide roller are spaced equidistant from the center of the enclosure.

In another embodiment, a storage device comprises: an enclosure; a first tape media reel disposed within the enclosure; a second tape media reel disposed within the enclosure; a plurality of guide rollers disposed within the enclosure, wherein a first hypothetical line intersects a topmost location (e.g., adjacent the third wall 402c) of at least two guide rollers of the plurality of guide rollers, wherein the topmost location of the at least two guide rollers is closer to a center of the enclosure as compared to a bottommost portion (e.g., adjacent the fourth wall 402d) of the first tape media reel; and a head positioning assembly for reading data from and writing data to tape media, wherein the head positioning assembly is disposed within the enclosure, wherein the head positioning assembly is movable to move a read head to a location that is substantially equal to a location of the first hypothetical line. The plurality of guide rollers comprises: a first guide roller; a second guide roller; a third guide roller; and a fourth guide roller, wherein the second guide roller and the third guide roller are the at least two guide rollers. The first guide roller and the fourth guide roller each have a center disposed along a fourth hypothetical line and wherein the fourth hypothetical line extends tangent to the second guide roller and the third guide roller. The first guide roller and the fourth guide roller are spaced equidistant from the center of the enclosure. The first guide roller and the fourth guide rollers are spaced farther from the center of the enclosure as compared to the second guide roller and the third guide roller.

In another embodiment, a storage device comprises: an enclosure; a first tape media reel disposed within the enclosure; a second tape media reel disposed within the enclosure; a plurality of guide rollers disposed within the enclosure, wherein the plurality of guide rollers cause tape media to follow a path from the first tape media reel to the second tape media reel that forms a "W" when viewed from a top of the enclosure; and a head positioning assembly for reading data from and writing data to the tape media, wherein the head positioning assembly is disposed within the enclosure, wherein the head positioning assembly is movable to move a read head to a reading location that is closer to a center of the enclosure than a non-reading location. A bottommost location (e.g., adjacent the fourth wall 402d) of the first tape media reel is disposed below a location of the topmost location (e.g., adjacent the third wall 402c) of the uppermost guide roller.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
an enclosure having a first wall, a second wall, a third wall extending between the first wall and the second wall, and a fourth wall extending between the first wall and the second wall, wherein the first wall and the second wall are substantially parallel to each other, and wherein the third wall and the fourth wall are substantially parallel to each other, the first, second, third, and fourth walls each consisting of a continuous surface without openings;
a first tape media reel disposed within the enclosure;
a second tape media reel disposed within the enclosure, wherein a first hypothetical line intersects a bottommost location of the first tape media reel and a bottommost location of the second tape media reel, wherein the bottommost location of the first tape media reel and the bottommost location of the second tape media reel is disposed farther away from the third wall as compared to a topmost location of the first tape media reel and a topmost location of the second tape media reel;

a head positioning assembly for reading data from and writing data to tape media, wherein the head positioning assembly is disposed within the enclosure, wherein the head positioning assembly is movable to move a read head to a location that is closer to a center of the enclosure than the first hypothetical line; and one or more guide rollers disposed within the enclosure.

2. The storage device of claim 1, wherein the first wall comprises a first surface having a first length, the second comprises a second surface having a second length about equal to the first length, the third wall comprises a third surface having a third length, and the fourth wall comprises a fourth surface having a fourth first length about equal to the third length.

3. A storage device, comprising:
an enclosure having a first wall, a second wall, a third wall extending between the first wall and the second wall, and a fourth wall extending between the first wall and the second wall, wherein the first wall and the second wall are substantially parallel to each other, and wherein the third wall and the fourth wall are substantially parallel to each other;

a first tape media reel disposed within the enclosure;

a second tape media reel disposed within the enclosure, wherein a first hypothetical line intersects a bottommost location of the first tape media reel and a bottommost location of the second tape media reel, wherein the bottommost location of the first tape media reel and the bottommost location of the second tape media reel is disposed farther away from the third wall as compared to a topmost location of the first tape media reel and a topmost location of the second tape media reel;

a head positioning assembly for reading data from and writing data to tape media, wherein the head positioning assembly is disposed within the enclosure, wherein the head positioning assembly is movable to move a read head to a location that is closer to a center of the enclosure than the first hypothetical line;

a first guide roller;

a second guide roller;

a third guide roller; and a fourth guide roller, wherein a second hypothetical line intersects a center of the second guide roller and the third guide roller.

4. The storage device of claim 3, wherein the second hypothetical line extends tangent to the first guide roller and the fourth guide roller.

5. The storage device of claim 3, wherein a third hypothetical line intersects a center of the first guide roller and the fourth guide roller.

6. The storage device of claim 5, wherein the third hypothetical line extends tangent to the second guide roller and the third guide roller.

7. The storage device of claim 6 wherein the second hypothetical line is closer to the center of the enclosure than the third hypothetical line.

8. The storage device of claim 3, wherein the first hypothetical line is closer to the center of the enclosure than the second hypothetical line.

9. The storage device of claim 3, wherein a third hypothetical line extends tangent to the second guide roller and the third guide roller.

10. The storage device of claim 9, wherein the third hypothetical line is closer to the center of the enclosure than the first hypothetical line.

11. The storage device of claim 3, wherein the second guide roller and the third guide roller are spaced equidistant from the center of the enclosure.

12. A storage device, comprising:
an enclosure;

a first tape media reel disposed within the enclosure;

a second tape media reel disposed within the enclosure;

a plurality of guide rollers disposed within the enclosure, wherein a first hypothetical line intersects a topmost location of at least two guide rollers of the plurality of guide rollers, wherein the topmost location of the at least two guide rollers is closer to a center of the enclosure as compared to a bottommost portion of the first tape media reel; and a head positioning assembly for reading data from and writing data to tape media, wherein the head positioning assembly is disposed within the enclosure, wherein the head positioning assembly is movable to move a read head to a location that is substantially equal to a location of the first hypothetical line.

13. The storage device of claim 12, wherein the plurality of guide rollers comprises:
a first guide roller;

a second guide roller;

a third guide roller; and a fourth guide roller, wherein the second guide roller and the third guide roller are the at least two guide rollers.

14. The storage device of claim 13, wherein the first guide roller and the fourth guide roller each has a center disposed along a fourth hypothetical line and wherein the fourth hypothetical line extends tangent to the second guide roller and the third guide roller.

15. The storage device of claim 13, wherein the first guide roller and the fourth guide roller are spaced equidistant from the center of the enclosure.

16. The storage device of claim 13, wherein the first guide roller and the fourth guide rollers are spaced farther from the center of the enclosure as compared to the second guide roller and the third guide roller.

* * * * *